United States Patent [19]

Chapman

[11] Patent Number: 4,877,525
[45] Date of Patent: Oct. 31, 1989

[54] PRESSURIZED VESSEL WITH FALSE BOTTOM AND THROUGHPIPE COATED AT WELD SITE

[75] Inventor: John W. Chapman, Boise, Id.
[73] Assignee: Micron Technology Inc, Boise, Id.
[21] Appl. No.: 261,706
[22] Filed: Oct. 24, 1988
[51] Int. Cl.⁴ ............................................. B01D 23/20
[52] U.S. Cl. .................................. 210/289; 210/291; 210/541; 220/3; 239/566
[58] Field of Search ...................... 210/289, 291, 541; 220/3; 239/600, 566

[56] References Cited

U.S. PATENT DOCUMENTS

| | | | |
|---|---|---|---|
| 139,922 | 6/1873 | Savery | 210/291 |
| 402,224 | 4/1889 | Blessing | 210/289 |
| 597,248 | 1/1898 | Rhood | 210/291 |
| 882,448 | 4/1908 | Boyd | 210/289 |
| 1,689,308 | 10/1928 | Stickney | 210/289 |
| 2,529,398 | 11/1950 | Krieck | 210/289 |
| 3,391,707 | 7/1968 | Riley et al. | 210/289 |
| 3,826,375 | 7/1974 | Fournier | 210/289 |
| 4,606,823 | 8/1986 | Lucas, III | 210/289 |
| 4,655,359 | 4/1987 | Fairgrieve | 220/3 |
| 4,785,956 | 11/1988 | Kepler et al. | 220/3 |

FOREIGN PATENT DOCUMENTS 398267 2/1974 U.S.S.R. ................ 210/291

Primary Examiner—Richard V. Fisher
Assistant Examiner—Cynthia L. Nessler
Attorney, Agent, or Firm—Hopkins French Crockett Springer & Hoopes

[57] ABSTRACT

A vessel for production of deionized water having increased resistance to corrosion and internal contamination. A throughpipe provided with external threads is welded to the domed bottom and the inner tank bottom and extends into the interior of the vessel. A corrosion-resistant coating is applied to the interior of the vessel and partially upwardly on the threaded portion of the throughpipe such that the gasket prevents deionized water and other corrosive materials from attacking and delaminating the coating.

5 Claims, 2 Drawing Sheets

"PRIOR ART"

"PRIOR ART"

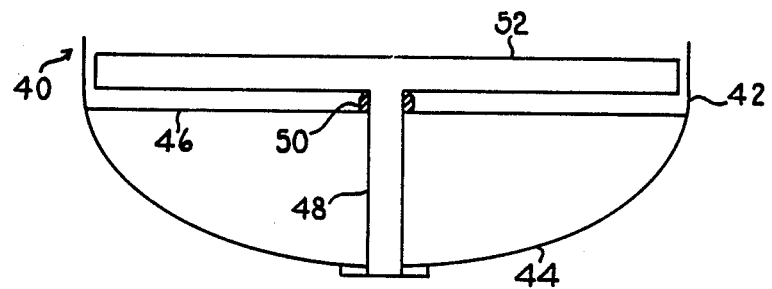
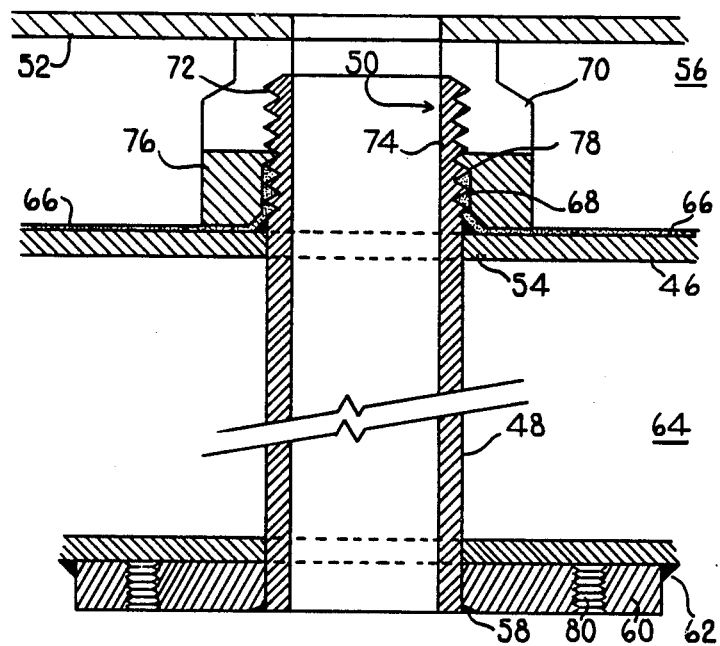

PRESSURIZED VESSEL WITH FALSE BOTTOM AND THROUGHPIPE COATED AT WELD SITE

BACKGROUND OF THE INVENTION

In a number of industries, particularly in electronics and electric power generating facilities, high purity water is necessary for effective process or manufacturing control. Particularly in the electronics industry, wherein both ionic and non-ionic impurities must be reduced to essentially zero, high purity water is essential. A number of systems have been developed to produce such water, the most prevalent being reverse osmosis procedures and ion exchange processes using successive two- or three-bed ion exchange systems. Such ion exchange beds rely upon anion and cation exchange beds for removal of impurities. A typical ion exchange resin bed is comprised of resin beads having a diameter of about 6–12 mm, with a random size distribution. Such ion exchange resin beds consist of a plastic backbone to which active or functional groups have been attached. The polymeric strands of the plastic backbone are connected through a network of cross-linking bonds that give each bead physical strength to withstand the hydraulic force generated during the demineralization cycle.

In strongly acidic and basic resins, the functional groups consist of an ionic pair. During service, the soluble contaminants enter the resin from the bulk water supply and exchange with the mobile ionic groups. The process reverses during regeneration, where contaminants are replaced by $H^+$ or $OH^-$ groups in the case of strong-acid and -base resins, respectively.

Ion exchange systems have evolved into two and three bed systems employing a strongly acidic cation resin ($H^+$) followed by a strongly basic anion resin ($OH^-$). Typically, this two bed system is followed by a mixed bed having both cation and anion resins for polishing the effluent of the two bed train.

The net result of such systems is deionized water, a highly corrosive liquid which is an aggressive solvent. Deionized water is chemically unstable-it will re-ionize if contacted by ionic contaminants. Therefore, production and storage facilities must be configured to prevent contamination.

Because of the highly corrosive nature of the deionized water, as well as the strong acids and bases used to regenerate the cation and anion exchange beds, respectively (HCL or $H_2SO_4$, and caustic sodium hydroxide), the materials utilized in the manufacture of process components (such as tanks and conduits) must be capable of withstanding extreme conditions. Stainless steel, or various steel alloys well known to those skilled in the art, are used for such purposes. Likewise, all fittings and weld seams must be equally corrosion resistant.

The vessels utilized in the production of deionized water utilizing ion exchange resin beds as set forth above, may be rated, for instance, at 250 gallons per minute throughput. Such vessels are pressurized, at a pressure of about 100 psi, to create and maintain flow therethrough. Generally speaking, the vessels are circular cross-section and are provided with rounded or curved vessel bottoms (the vessel "dome") to better withstand the internal pressures generated. Most such systems are provided with a "false bottom" within the vessel, a flat bottom across the vessel and above the bottom dome, to insure uniform movement of water through the resin bed retained by the false bottom, which would not be possible if the resin bed were asymmetrically retained by the domed bottom. In order to protect the metal components of the vessels, the interior portions exposed to the deionized water and resins are lined with an impervious lining, such as PVC or natural rubber.

The false bottoms in such vessels present a problem in water flow exiting the vessel: either the effluent water must flow into the dead space between the false bottom and the domed bottom to be drained therefrom or it must be transported therethrough with a conduit. In the first instance, the entire space between the false bottom and the domed bottom must be lined with a corrosion-resistant coating similar to that used to line the vessel. Because the coating must be applied after the false bottom is welded in place, access within the space between the false bottom and domed bottom is extremely limited, thereby making effective application of the lining in this area extremely difficult. In the second case, the conduit has been placed within a line sleeve which interconnects the interior of the vessel above the false bottom and the exit pipe from the bottom dome. In this second case, it is difficult if not impossible to effectively prevent water and/or resin from stagnating in the space between the sleeve and the throughpipe which conducts the water from the vessel. Such stagnant water area inevitably results in excess corrosion or organic contamination of the purified water.

The apparatus of the present invention eliminates the need to line the interior of the dead space between the false bottom and the bottom dome, and eliminates the stagnant space between the throughpipe and the sleeve. Therefore, the present invention provides a deionizing water vessel which is easier to construct and exhibits less corrosion and contamination than that possible through use of prior art apparatus'.

SUMMARY OF THE INVENTION

The present invention relates to vessels for producing deionized water, and specifically to vessels having either one or both of cation and anion scavenging resins. The unique design of the present invention eliminates costly corrosion-resistant linings in non-functional portions of the vessel, and also eliminates the possibility of corrosion and contamination resulting from stagnant water areas.

The invention apparatus comprises a throughpipe which extends from a lower or outer bottom dome, through an inner or false tank bottom and then inwardly into the tank interior. The throughpipe is welded to both the false bottom and the bottom dome. A corrosion-resistant lining is applied to the interior of the vessel, including the upper surface of the false bottom and partially up the portion of the throughpipe extending above the false bottom. Because water is not passed through or retained within the space between the bottom dome and the inner tank bottom, the inner portion of this area is not lined.

A distribution header is affixed to the throughpipe by means of a threaded sleeve which is threaded onto the portion of the throughpipe extending above the false bottom. A compressible gasket is fitted about the throughpipe and compressed between the sleeve and the inner tank bottom. The gasket is preferably of a polymeric-type material which is resistant to corrosion by deionized water or the resins used in the production of deionized water. The gasket is compressed and covers the upper edge portion of the coating which extends partially up the throughpipe above the inner tank bottom, thereby preventing contact between the upper edge of the coating and deionized water/resin.

The design of the apparatus of the present invention is susceptible to relatively simple construction, to an easily applied corrosionresistant coating, and does so without the possibility of stagnant water areas leading to corrosion and/or contamination. The apparatus is not subject to undue stress during countercurrent flow while regenerating the resin beds, and is easily repaired if leaks develop.

BRIEF DESCRIPTION OF THE DRAWINGS

FIG. 2 is a schematic representation of the apparatus of the present invention; and FIG. 3 is an enlarged view of the inventive portion of the apparatus of the present invention.

DETAILED DESCRIPTION OF THE INVENTION

Figure 1A:
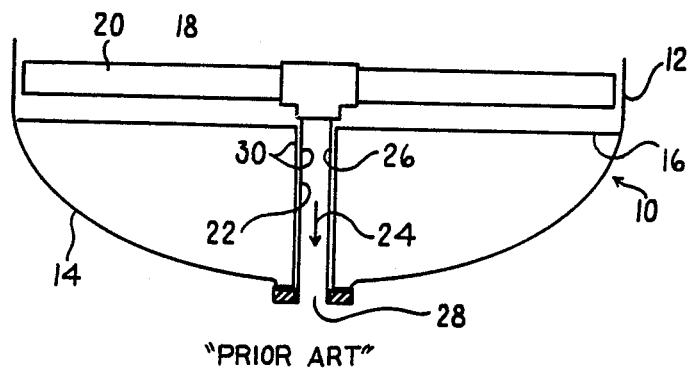
FIGS. 1A and 1B are schematic representations of conventional apparatus of the "prior art"
Figure 1B:
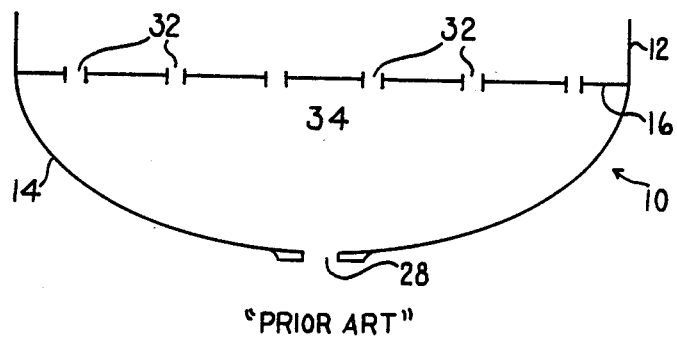

FIGS. 1A and 1B illustrate examples of the "prior art" deionized water vessels most commonly used. FIG. 1A illustrates a vessel, generally designated 10 having sidewalls 12 and a bottom dome portion 14 with a false bottom 16 disposed across the entire vessel 10. The interior 18 of vessel 10 is provided with the resin bed through which the deionized water is directed. Within the interior of the vessel is a distribution header 20 which collects deionized water from within the vessel and directs it through a throughpipe 22 in the direction of arrow 24 for further processing or use. The throughpipe 22 is retained within an over-sized sleeve 26 welded in place between the false bottom 16 and the aperture 28 in the bottom of dome 14. A stagnant water area 30 exists between the sleeve 26 and throughpipe 22.

FIG. 1B illustrates a second embodiment of the "prior art" wherein the false bottom 16 is provided with a plurality of strainer/diffuser heads 32 adapted to permit passage therethrough of deionized water, while retaining the resin bed within the interior 18 of tank 10. Deionized water is directed into the dead space 34 between false bottom 16 and bottom dome 14 where it is thereafter directed through aperture 28 for further processing or use.

As is apparent in FIG. 1A, the stagnant water area 30 is a source of contamination and corrosion which is inherent in the design of the apparatus illustrated therein. Likewise, in FIG. 1B, the dead space 34 and each of the strainer/diffuser heads 32 must be effectively lined with a corrosion-resistant lining or coating, which is extremely difficult in the limited access available within the dead space 34.

By contrast, the apparatus of the present invention, illustrated schematically in FIG. 2, provides a vessel 40 having sidewalls 42, bottom dome 44 and a false bottom 46 similar to that of FIG. 1. However, a throughpipe 48 is welded to both the false bottom 46 and the bottom dome 44, thereby eliminating both the dead space 30 of FIG. 1A and the lined inner portion 34 of bottom dome 14 of FIG. 1B. The throughpipe 48 is provided with a portion 50 extending above the false bottom onto which is threaded the distribution header 52.

As seen in more detail in FIG. 3, the throughpipe 48 is welded at 54 to the false bottom 46 on a seam within the interior 56 of vessel 40. The throughpipe extends through the bottom dome 44 and is welded at 58 to a flange 60 which is in turn welded at 62 to the bottom dome. The space 64 between the lower surface of false bottom 46 and the upper surface of bottom dome 44 is a vented air space which does not come into contact with either the deionized water or the resins contained within vessel 40.

A corrosion-resistant coating 66 is provided throughout the upper surface of the false bottom 46 contiguous with the inner surfaces of sidewalls 44 and the upper dome surface (not shown) of vessel 40. The coating 66 extends over the weld seam 54 and a portion 68 of coating 66 extends up the portion 50 of throughpipe 48 above the false bottom 46.

The distribution head 52 is secured to the throughpipe 48 by means of a sleeve 70 having internal threads 72 which cooperate with the external threads 74 of portion 50. Secured between the sleeve 70 and false bottom 46 is a gasket 76 surrounding portion 50 which is compressed between sleeve 70 and false bottom 46. Gasket 76 is preferably a compressible, elastomeric material which, when compressed, will effectively seal both the weld seam 54 and the upper edge 78 of the coating which extends up the portion 50 of throughpipe 48.

Flange 60 may be provided with means, such as threaded bolt holes 80 to which may be secured conduit fittings (not shown) in order to transport the effluent water from vessel 40 for further processing or use.

The unique apparatus of the present invention provides a number of benefits over the apparatus of the prior art. Firstly, the air space 64 need not be lined, a difficult, time-consuming, and expensive process. Because the air space 64 does not contact either the deionized water or the resin bed, corrosion will not occur. Secondly, because the distribution header 52 is retained upon sleeve 70, deionized water directed through the header enters the throughpipe 48 and exits the vessel 40 without the need for a retaining sleeve 26 as illustrated in FIG. 1A. There is no area incident to the throughpipe 48 where water may stagnate and result in either undue corrosion or contamination. Thirdly, the unique sleeve/gasket arrangement insures that the corrosive water and resins cannot attack the coating at its edge 78. Without the gasket 76, over a period of time it is likely that the bond between the upper edge of the coating and the throughpipe would be deteriorated, thereby permitting corrosive water and resins to enter between the coating and the vessel, causing delamination of the coating, corrosion and contamination.

Countercurrent flow during regeneration of the resin beds historically created reverse stress on the apparatus of the prior art, including cracks or weld failures and subsequent leaks. Such leaks permitted resin to be discharged into the ultra pure effluent of such systems. The construction of the apparatus of the present invention is sufficiently rigid, with the welded-in-place throughpipe, that even countercurrent flow is unlikely to induce sufficient stress to crack the weld seams between the throughpipe and the tank.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

I claim:

1. In an apparatus for the manufacture of deionized water comprising a pressurized vessel containing deionizing resin, an inner tank bottom and a lower tank dome defining an air space therebetween, the air space not in fluid communication with the deionized water or the deionizing resin, the improvement comprising:
   (a) a throughpipe threadably engaged at an upper end to a distribution header above the inner tank bottom, said throughpipe extending through the inner tank bottom, through the air space and thence through the lower tank dome, said throughpipe being welded at a weld site to the inner tank bottom; and
   (b) a corrosion-resistant coating applied to the interior of the pressurized vessel and the inner tank bottom, and extending upwardly to cover the weld site and at least a portion of the throughpipe extending above the inner tank bottom; and
   (c) seal means applied to the throughpipe between the distribution header and the corrosion-resistant coating applied to the inner tank bottom and covering an upper edge of the coating applied to the throughpipe.

2. The apparatus as recited in claim 1, wherein the corrosion-resistant coating is applied over the weld site such that the juncture between the throughpipe and the inner tank bottom is sealed.

3. The apparatus as recited in claim 1, wherein the throughpipe extends above the inner tank bottom and is provided with external threads.

4. The apparatus as recited in claim 3, wherein the seal means comprises an elastomeric compressible member and a threaded member having internal threads adapted to cooperate with the throughpipe.

5. The apparatus as recited in claim 4, wherein when the threaded member is threaded onto the throughpipe, the compressible member is compressed between the threaded member and the inner tank bottom and effectively seals the upper edge of the coating applied to the throughpipe from deionized water contained in the pressurized vessel.

* * * * *